United States Patent
Malow et al.

(10) Patent No.: US 8,278,232 B2
(45) Date of Patent: Oct. 2, 2012

(54) PYROCHLORE MATERIALS AND A THERMAL BARRIER COATING WITH THESE PYROCHLORE MATERIALS

(75) Inventors: Thomas Malow, Mülheim/Ruhr (DE); Matthias Oechsner, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 399 days.

(21) Appl. No.: 12/311,544

(22) PCT Filed: Jun. 21, 2007

(86) PCT No.: PCT/EP2007/056188
§ 371 (c)(1),
(2), (4) Date: Dec. 11, 2009

(87) PCT Pub. No.: WO2008/040574
PCT Pub. Date: Apr. 10, 2008

(65) Prior Publication Data
US 2010/0093516 A1    Apr. 15, 2010

(30) Foreign Application Priority Data
Oct. 2, 2006 (EP) .................... 06020703

(51) Int. Cl.
*C04B 35/50* (2006.01)
*C04B 35/51* (2006.01)
*H01M 8/10* (2006.01)
*H01M 4/02* (2006.01)
*H01M 4/36* (2006.01)

(52) U.S. Cl. .......... 501/152; 429/495; 429/532

(58) Field of Classification Search ........... 501/103, 501/104, 108, 136, 152; 429/495, 532, 533
See application file for complete search history.

(56) References Cited

U.S. PATENT DOCUMENTS

| 602,479 A | 2/2000 | Kurz et al. | |
|---|---|---|---|
| 6,117,560 A * | 9/2000 | Maloney | 428/472 |
| 6,177,200 B1 | 1/2001 | Maloney | |
| 6,231,991 B1 | 5/2001 | Maloney | |
| 6,238,816 B1 * | 5/2001 | Cable et al. | 429/425 |
| 6,258,467 B1 | 7/2001 | Subramanian | |
| 6,284,323 B1 | 9/2001 | Maloney | |
| 6,632,554 B2 * | 10/2003 | Doshi et al. | 429/489 |
| 6,924,040 B2 | 8/2005 | Maloney | |
| 6,946,208 B2 | 9/2005 | Subramanian et al. | |
| 2006/0245984 A1 * | 11/2006 | Kulkarni et al. | 422/177 |

FOREIGN PATENT DOCUMENTS

| DE | 19841872 A1 | 3/2000 |
|---|---|---|
| EP | 0412397 B1 | 2/1991 |
| EP | 0486489 B1 | 5/1992 |
| EP | 0786017 B1 | 7/1997 |
| EP | 0892090 A1 | 1/1999 |

(Continued)

OTHER PUBLICATIONS

Omata et al., "Proton solubility for La2Zr2O7 with a pyrochlore structure doped with a series of alkaline-earth ions", Solid State Ionics 167, 2004, pp. 389-397, Elsevier B.V.

(Continued)

*Primary Examiner* — Noah Wiese

(57) ABSTRACT

A pyrochlore ceramic material and a thermal barrier coating containing pyrochlore ceramic materials are provided. Using the thermal barrier coating in a single or double layer which includes magnesium and/or titanium can improve the spallation behavior and the thermal expansion coefficient of the component onto which the thermal barrier coating is applied.

2 Claims, 4 Drawing Sheets

FOREIGN PATENT DOCUMENTS

| | | | |
|---|---|---|---|
| EP | 0987348 A1 | 3/2000 |
| EP | 0992603 A1 | 4/2000 |
| EP | 1160 357 A1 | 12/2001 |
| EP | 1204776 B1 | 5/2002 |
| EP | 1306454 A1 | 5/2003 |
| EP | 1319729 A1 | 6/2003 |
| EP | 1321542 A1 | 6/2003 |
| EP | 1607379 A1 | 12/2005 |
| RU | 1776089 C | 1/1995 |
| RU | 2218451 C2 | 12/2003 |
| RU | 2228389 C2 | 5/2004 |
| WO | WO 99/67435 A1 | 12/1999 |
| WO | WO 00/44949 A1 | 8/2000 |
| WO | WO 02/14580 A2 | 2/2002 |
| WO | WO 02/053492 A1 | 7/2002 |

OTHER PUBLICATIONS

Communication from Russian Federation Patent Office, Jan. 25, 2012, pp. 1-4.

\* cited by examiner

FIG 6

| material | C | Cr | Ni | Co | Mo | W | Ta | Nb | Al | Ti | B | Zr | Hf |
|---|---|---|---|---|---|---|---|---|---|---|---|---|---|
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | 1.00 |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX-2 | <.006 | 8.0 | Rest | 4.6 | 0.6 | 8.0 | 6.0 | | 5.6 | 1.0 | <.003 | <.0075 | |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | 0.10 |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemical composition in %

PYROCHLORE MATERIALS AND A THERMAL BARRIER COATING WITH THESE PYROCHLORE MATERIALS

CROSS REFERENCE TO RELATED APPLICATIONS

This application is the US National Stage of International Application No. PCT/EP2007/056188, filed Jun. 21, 2007 and claims the benefit thereof The International Application claims the benefits of European Patent Office application No. 06020703.2 EP filed Oct. 2, 2006, both of the applications are incorporated by reference herein in their entirety.

FIELD OF INVENTION

The invention relates to pyrochlore materials and thermal barrier coatings with these pyrochlore materials.

BACKGROUND OF INVENTION

Metallic components which are exposed to a high temperature must be protected against heat and corrosion. This is especially needed for parts of gas turbines like combustions chambers, turbine blades or vanes. These parts are commonly coated with an intermediated MCrAlY-layer and a ceramic thermal barrier coating (TBC) which is applied on top of the intermediate layer.

It is known to use either $Gd_2Zr_2O_7$ or $Gd_2Hf_2O_7$ as thermal barrier coating.

EP 0 992 603 A1 discloses $(Gd, La, Y)_2 (Ti, Zr, Hf)_2 O_7$ pyrochlore structures.

EP 1 321 542 A1 discloses an oxide mixture of $Gd_2O_3$ and $HfO_2$, wherein Hafnia or gadolinia can be replaced by oxides like Zirconia, Samaria, Europia, Ytterbia or neodynia.

SUMMARY OF INVENTION

These materials known in the state of art can also be further improved according to their thermal expansion coefficient and spallation behaviour.

It is therefore the aim of the invention to solve the problem mentioned above.

The problem is solved by the pyrochlore materials as given in the claims and a thermal barrier coating as given in the claims.

In the dependent claims further advantages of the invention are listed whereby the dependent claims can be combined with each other in order to achieve further advantages.

BRIEF DESCRIPTION OF THE DRAWINGS

It shows
FIG. 1, 2 examples of layer systems,
FIG. 3 a gas turbine,
FIG. 4 a turbine blade or vane,
FIG. 5 a combustion chamber and
FIG. 6 list of superalloy.

DETAILED DESCRIPTION OF INVENTION

The inventive pyrochlore material comprises:

$Gd_{2-x}Mg_xZr_2O_{7-a}$ or $Gd_{2-x}Mg_xHf_2O_{7-a}$ or $Gd_{2-x}Mg_xTi_2O_{7-a}$ or $Gd_{2-x}Mg_xZr_{2-y}Ti_yO_{7-a}$ or $Gd_{2-x}Mg_xZr_{2-y}Hf_yO_{7-a}$ or $Gd_{2-x}Mg_xHf_{2-y}Ti_yO_{7-a}$ or $Gd_{2-x}Mg_xHf_{2-y-z}Zr_zTi_yO_{7-a}$ or $Gd_2Hf_{2-y}Ti_yO_{7-a}$ or $Gd_2Hf_{2-y-z}Zr_yTi_zO_{7-a}$, wherein Gd can preferably be replaced by Sm, especially totally replaced by Sm:

$Sm_{2-x}Mg_xHf_2O_{7-a}$ or $Sm_{2-x}Mg_xTi_2O_{7-a}$ or $Sm_{2-x}Mg_xZr_{2-y}Ti_yO_{7-a}$ or $Sm_{2-x}Mg_xZr_{2-z}Hf_zO_{7-a}$ or $Sm_{2-x}Mg_xHf_{2-y}Ti_yO_{7-a}$ or $Sm_{2-x}Mg_xHf_{2-y-z}Zr_zTi_yO_{7-a}$ or $Sm_2Zr_{2-y}Ti_yO_{7-a}$ or $Sm_2Hf_{2-y}Ti_yO_{7-a}$ or $Sm_2Hf_{2-y-z}Zr_zTi_yO_{7-a}$ with $0<x<2$; $0<y<2$; $0\leq a\leq1$; $0<z<2$; $y+z<2$.

The magnesium (Mg) can preferably be replaced by Calzium (Ca). Titanium (Ti) can preferably be replaced by Aluminium (Al). $Gd_2Zr_{2-x}Ti_xO_7$ and $Sm_{2-x}Mg_xZr_2O_{7-a}$ are not claimed as pyrochlore materials.

Especially the pyrochlore material consists of one of the following materials:

$Gd_{2-x}Mg_xZr_2O_{7-a}$ or $Gd_{2-x}Mg_xHf_2O_{7-a}$ or $Gd_{2-x}Mg_xTi_2O_{7-a}$ or $Gd_{2-x}Mg_xZr_{2-y}Ti_yO_{7-a}$ or $Gd_{2-x}Mg_xZr_{2-y}Hf_yO_{7-a}$ or $Gd_{2-x}Mg_xHf_{2-y}Ti_yO_{7-a}$ or $Gd_{2-x}Mg_xHf_{2-y-z}Zr_zTi_yO_{7-a}$ or $Gd_2Hf_{2-y}Ti_yO_{7-a}$ or $Gd_2Hf_{2-y-z}Zr_yTi_3O_{7-a}$, wherein Gd can preferably be replaced by Sm, especially totally replaced by Sm:

$Sm_{2-x}Mg_xHf_2O_{7-a}$ or $Sm_{2-x}Mg_xTi_2O_{7-a}$ or $Sm_{2-x}Mg_xZr_{2-y}Ti_yO_{7-a}$ or $Sm_{2-x}Mg_xZr_{2-z}Hf_zO_{7-a}$ or $Sm_{2-x}Mg_xHf_{2-y}Ti_yO_{7-a}$ or $Sm_{2-x}Mg_xHf_{2-y-z}Zr_zTi_yO_{7-a}$ or $Sm_2Hf_{2-y}Ti_yO_{7-a}$ or $Sm_2Zr_{2-y}Ti_yO_{7-a}$ or $Sm_2Hf_{2-y-z}Zr_zTi_yO_{7-a}$ with $0<x<2$; $0<y<2$; $0\leq a\leq 1$; $0<z<2$; $y+z<2$.

Gadolinium (Gd) or Samarium (Sm) can be replaced by Neodynium (Nd) or Europium (Eu), Ytterbium (Yb), especially totally replaced by Nd, Eu or Yb.

Figure 1:
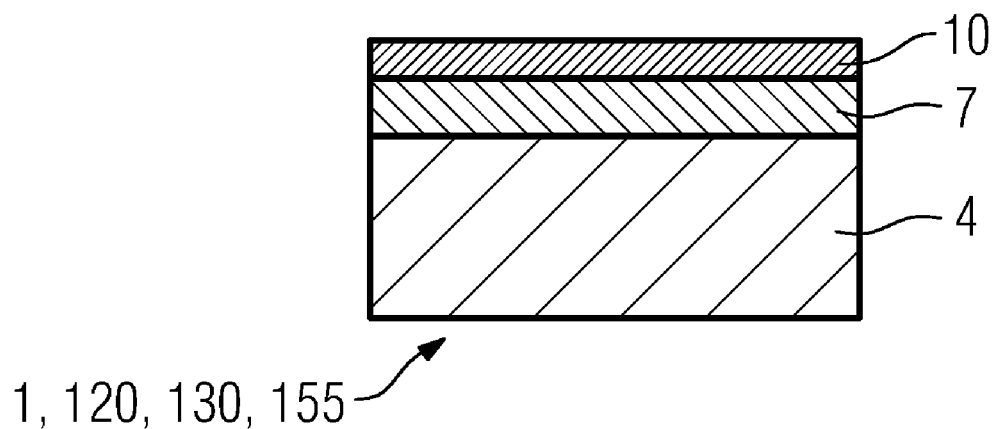
Figure 5:
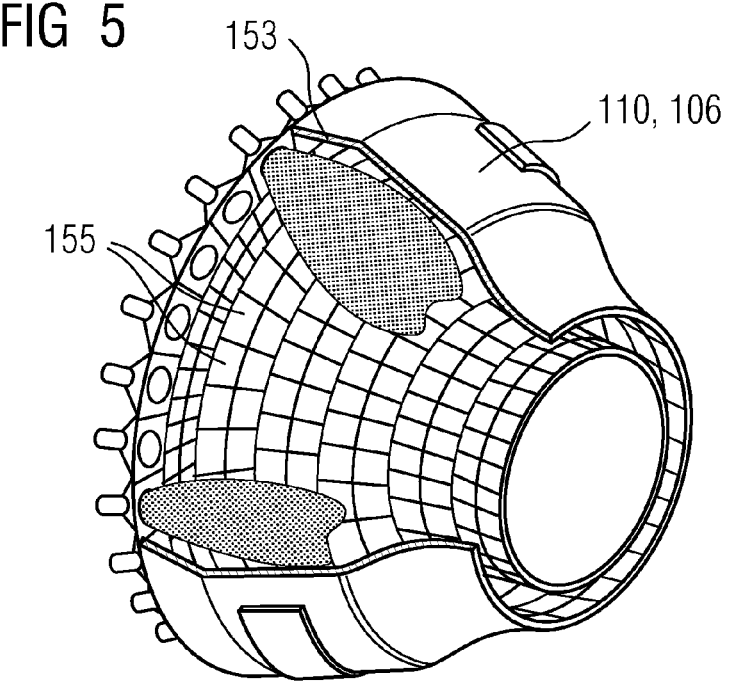

In FIG. 1 a component 1, 120, 130 (FIG. 3, 4), 155 (FIG. 5) is shown which comprises a substrate 4. The substrate 4 can be a nickel- or cobalt-based super alloy. Especially a nickel-based super-alloy is used (FIG. 6).

On this substrate 4, especially direct on the substrate 4 a bonding and/or protective layer 7 is applied, especially a MCrAlX-layer is used, which forms or has an oxide layer (TGO). Especially Yttrium is used (X=Y).

On this intermediate layer 7 an outer single layered ceramic thermal barrier 10 coating (TBC) 10 is applied.

This thermal barrier coating 10 comprises preferably one of the materials like:

$Gd_{2-x}Mg_xZr_2O_{7-a}$ or $Gd_{2-x}Mg_xHf_2O_{7-a}$ or $Gd_{2-x}Mg_xTi_2O_{7-a}$ or $Gd_{2-x}Mg_xZr_{2-y}Ti_yO_{7-a}$ or $Gd_{2-x}Mg_xZr_{2-y}Hf_yO_{7-a}$ or $Gd_{2-x}Mg_xHf_{2-y}Ti_yO_{7-a}$ or $Gd_{2-x}Mg_xHf_{2-y-z}Zr_zTi_yO_{7-a}$ or $Gd_2Hf_{2-y}Ti_yO_{7-a}$ or $Gd_2Hf_{2-y-z}Zr_yTi_3O_{7-a}$, wherein Gd can be replaced by Sm, especially totally replaced by Sm:

$Sm_{2-x}Mg_xHf_2O_{7-a}$ or $Sm_{2-x}Mg_xTi_2O_{7-a}$ or $Sm_{2-x}Mg_xZr_{2-y}Ti_yO_{7-a}$ or $Sm_{2-x}Mg_xZr_{2-z}Hf_zO_{7-a}$ or $Sm_{2-x}Mg_xHf_{2-y}Ti_yO_{7-a}$ or $Sm_{2-x}Mg_xHf_{2-y-z}Zr_zTi_yO_{7-a}$ or $Sm_2Hf_{2-y}Ti_yO_{7-a}$ or $Sm_2Zr_{2-y}Ti_yO_{7-a}$ or $Sm_2Hf_{2-y-z}Zr_zTi_yO_{7-a}$ with $0<x<2$; $0<y<2$; $0\leq a\leq 1$; $0<z<2$; $y+z<2$, Gadolinium Gd) or Samarium (Sm) can be replaced by Neodynium (Nd), Europium (Eu) or by Ytterbium (Yb). Also mixtures of these materials are possible. $Gd_2Zr_{2-x}Ti_xO_7$ and $Sm_{2-y}Mg_xZr_2O_{7-a}$ are not claimed as pyrochlore materials in a single layered system.

Especially the thermal barrier coating 10 preferably consists of one of the materials:

$Gd_{2-x}Mg_xZr_2O_{7-a}$ or $Gd_{2-x}Mg_xHf_2O_{7-a}$ or $Gd_{2-x}Mg_xTi_2O_{7-a}$ or $Gd_{2-x}Mg_xZr_{2-y}Ti_yO_{7-a}$ or $Gd_{2-x}Mg_xZr_{2-y}Hf_zO_{7-a}$ or $Gd_{2-x}Mg_xHf_{2-y}Ti_yO_{7-a}$ or $Gd_{2-x}Mg_xHf_{2-y-z}Zr_zTi_yO_{7-a}$ or $Gd_2Hf_{2-y}Ti_yO_{7-a}$ or $Gd_2Hf_{2-y-z}Zr_yTi_zO_{7-a}$, wherein Gd can preferably be replaced by Sm, especially totally replaced by Sm:

$Sm_{2-x}Mg_xHf_2O_{7-a}$ or $Sm_{2-x}Mg_xTi_2O_{7-a}$ or $Sm_{2-x}Mg_xZr_{2-y}Ti_yO_{7-a}$ or $Sm_{2-x}Mg_xZr_{2-z}Hf_zO_{7-a}$ or $Sm_{2-x}Mg_xHf_{2-y}Ti_yO_{7-a}$ or $Sm_{2-x}Mg_xHf_{2-y-z}Zr_zTi_yO_{7-a}$ or $Sm_2Hf_{2-y}Ti_yO_{7-a}$ or $Sm_2Zr_{2-y}Ti_yO_{7-a}$ or $Sm_2Hf_{2-y-z}Zr_zTi_yO_{7-a}$ with $0<x<2$; $0<y<2$; $0\leq a\leq 1$; $0<z<2$; $y+z<2$.

The magnesium (Mg) can preferably be replaced by Calzium (Ca). Titanium (Ti) can preferably be replaced by Aluminium (Al).

Figure 2:
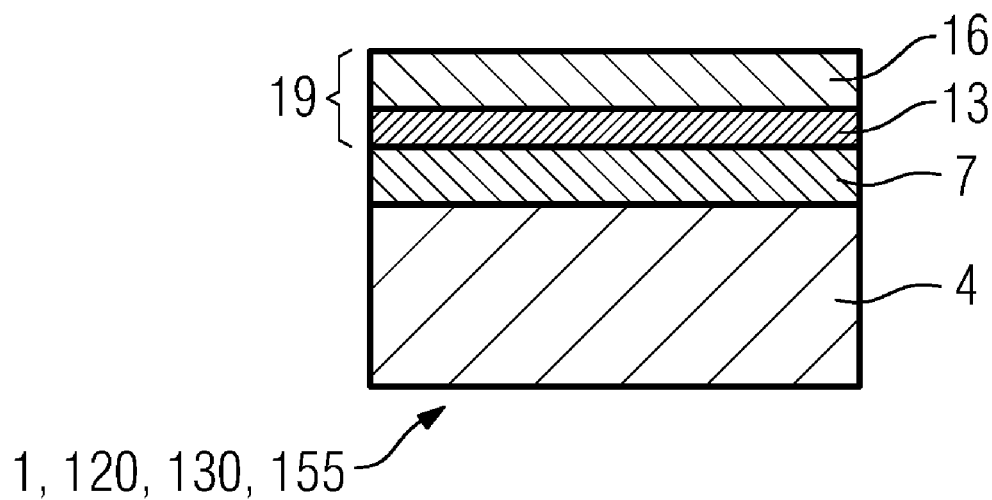

FIG. 2 shows a layered ceramic barrier coating 19, especially a two layered system which comprises, especially consists of an inner ceramic thermal barrier 13 and an outer ceramic thermal barrier 16. Especially the ceramic thermal barrier coating 16 is the outermost coating of the layered system.

The inner ceramic thermal barrier coating 13 comprises one of the materials $Sm_{2-x}Mg_xZr_2O_{7-a}$ or $Sm_{2-x}Mg_xHf_2O_{7-a}$ or $Sm_{2-x}Mg_xTi_2O_{7-a}$ or $Sm_{2-x}Mg_xZr_{2-y}Ti_yO_{7-a}$ or $Sm_{2-x}Mg_xZr_{2-z}Hf_zO_{7-a}$ or $Sm_{2-x}Mg_xHf_{2-y}Ti_yO_{7-a}$ or $Sm_{2-x}Mg_xHf_{2-y-z}Zr_zTi_yO_{7-a}$ or $Sm_2Hf_{2-y}Ti_yO_{7-a}$ or $Sm_2Zr_{2-y}Ti_yO_{7-a}$ or $Sm_2Hf_{2-y-z}Zr_zTi_yO_{7-a}$ with $0<x<2$; $0<y<2$; $0\leq a\leq 1$; $0<z<2$; $y+z<2$.

Especially the inner TBC 13 consists of one of the materials $Sm_{2-x}Mg_xZr_2O_{7-a}$ or $Sm_{2-x}Mg_xHf_2O_{7-a}$ or $Sm_{2-x}Mg_xTi_2O_{7-a}$ or $Sm_{2-x}Mg_xZr_{2-y}Ti_yO_{7-a}$ or $Sm_{2-x}Mg_xZr_{2-z}Hf_zO_{7-a}$ or $Sm_{2-x}Mg_xHf_{2-y}Ti_yO_{7-a}$ or $Sm_{2-x}Mg_xHf_{2-y-z}Zr_zTi_yO_{7-a}$ or $Sm_2Hf_{2-y}Ti_yO_{7-a}$ or $Sm_2Zr_{2-y}Ti_yO_{7-a}$ or $Sm_2Hf_{2-y-z}Zr_zTi_yO_{7-a}$ with $0<x<2$; $0<y<2$; $0\leq a\leq 1$; $0<z<2$; $y+z<2$.

Especially $a=x/2$ is chosen. The magnesium (Mg) can preferably be replaced by Calzium (Ca). Titanium (Ti) can preferably be replaced by Aluminium (Al). The titanium (Ti) leads to reduction of spallation of the ceramic coating. The Mg leads to an adaptation of the thermal expansion coefficient to the coefficients of the superalloys and/or metallic layers.

The inner ceramic thermal barrier coating 13 can also comprise or consist of YSZ.

The outer ceramic thermal barrier 16 coating comprises $Gd_{2-x}Mg_xZr_2O_{7-a}$ or $Gd_{2-x}Mg_xHf_2O_{7-a}$ or $Gd_{2-x}Mg_xTi_2O_{7-a}$ or $Gd_{2-x}Mg_xZr_{2-y}Ti_yO_{7-a}$ or $Gd_{2-x}Mg_xZr_{2-y}Hf_zO_{7-a}$ or $Gd_{2-x}Mg_xHf_{2-y}Ti_yO_{7-a}$ or $Gd_{2-x}Mg_xHf_{2-y-z}Zr_zTi_yO_{7-a}$ or $Gd_2Hf_{2-y-z}Zr_yTi_zO_{7-a}$ or $Gd_2Zr_{2-x}Ti_xO_{7-a}$ or $Gd_2Hf_{2-y}Ti_yO_{7-a}$.

Especially the outer TBC 16 consists of one of the materials $Gd_{2-x}Mg_xZr_2O_{7-a}$ or $Gd_{2-x}Mg_xHf_2O_{7-a}$ or $Gd_{2-x}Mg_xTi_2O_{7-a}$ or $Gd_{2-x}Mg_xZr_{2-y}Ti_yO_{7-a}$ or $Gd_{2-x}Mg_xZr_{2-y}Hf_zO_{7-a}$ or $Gd_{2-x}Mg_xHf_{2-y}Ti_yO_{7-a}$ or $Gd_{2-x}Mg_xHf_{2-y-z}Zr_zTi_yO_{7-a}$ or $Gd_2Hf_{2-y-z}Zr_yTi_zO_{7-a}$ or $Gd_2Zr_{2-x}Ti_xO_{7-a}$ or $Gd_2Hf_{2-y}Ti_yO_{7-a}$.

Titanium (Ti) can preferably be replaced by Aluminium (Al).

In the layer system similar to FIG. 1 or FIG. 2 the ceramic barrier coating 10, 13, 16 can have a gradient in the composition. The gradient in the composition can be achieved by increasing or decreasing the values for the parameter x, y, z.

The composition can also change especially gradually from $Gd_{2-x}Mg_xHf_2O_{7-a}$ to $Gd_{2-x}Mg_xHf_{2-y}Ti_yO_{7-a}$ and finally at the outermost surface area to $Gd_2Hf_{2-y}Ti_yO_{7-a}$.

FIG. 1 shows a layer system 1 according to the invention.

The layer system 1 comprises a metallic substrate 4, which in particular for components used at high temperatures consists of a nickel-base or cobalt-base superalloy.

Directly on the substrate 4 there is a metallic bonding layer 7, which consists either of
11 wt %-13 wt % cobalt, 20 wt %-22 wt % chromium, 10.5 wt %-11.5 wt %
aluminum,
0.3 wt %-0.5 wt % yttrium, 1.5 wt %-2.5 wt % rhenium, remainder nickel, or
24 wt %-26 wt % cobalt, 16 wt %-18 wt % chromium, 9.5 wt %-11 wt %
aluminum,
0.3 wt %-0.5 wt % yttrium, 0.5 wt %-2 wt % rhenium, remainder nickel.

Even before the application of further ceramic layers, an aluminum oxide layer has formed on this metallic bonding layer 7, or an aluminum oxide layer of this type is formed during operation. A fully or partially stabilized zirconium oxide layer can be present as inner ceramic layer 10 on the metallic bonding layer 7 or on the aluminum oxide layer (not shown). It is preferable to use yttrium-stabilized zirconium oxide. It is also possible to use calcium oxide, cerium oxide or hafnium oxide to stabilize zirconium oxide. The zirconium oxide is preferably applied as a plasma-spray layer, but also may be applied as a columnar structure by means of electron beam physical vapor deposition.

Figure 3:
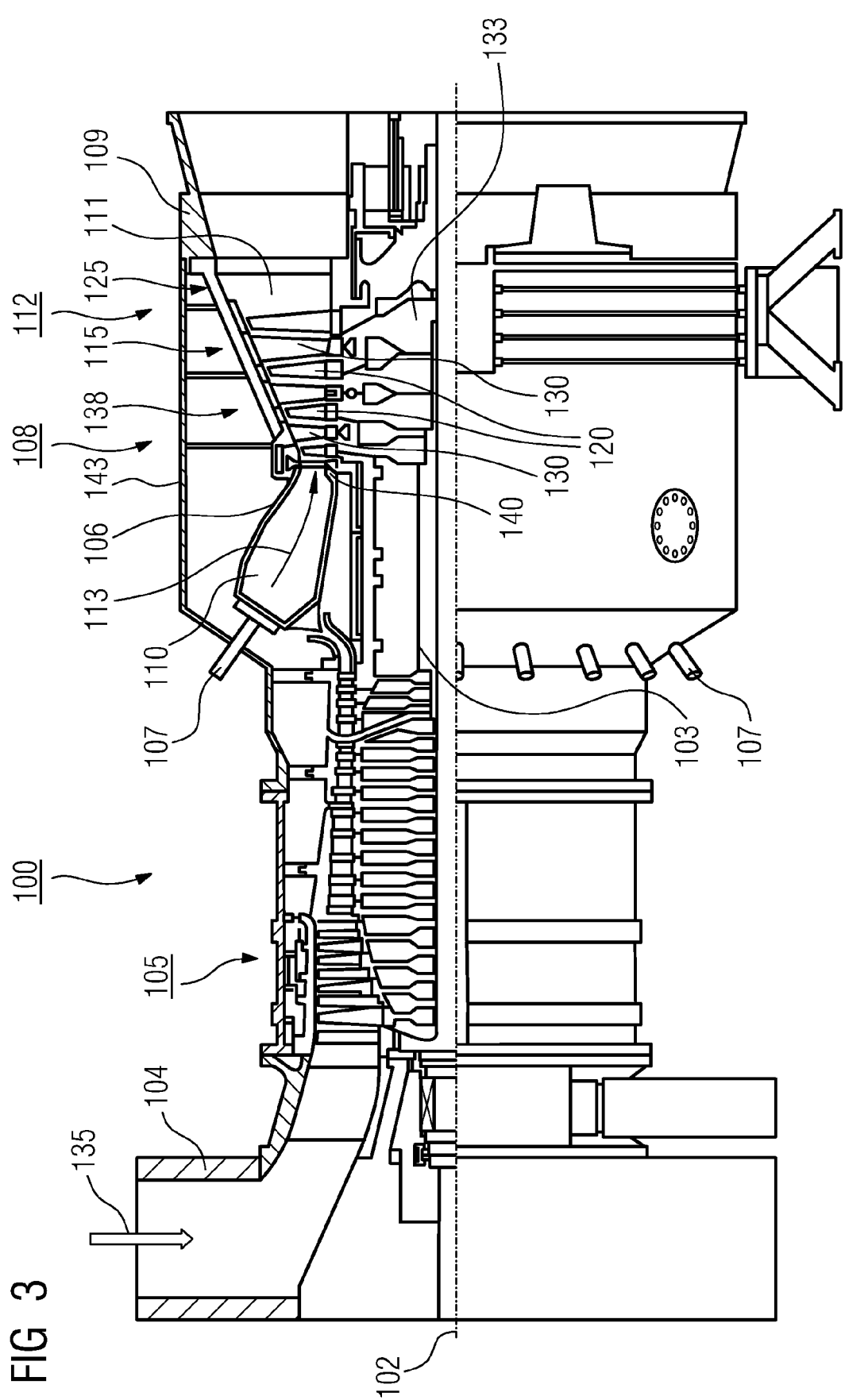

FIG. 3 shows, by way of example, a partial longitudinal section through a gas turbine 100. In the interior, the gas turbine 100 has a rotor 103 which is mounted such that it can rotate about an axis of rotation 102 and has a shaft 101 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103. The annular combustion chamber 110 is in communication with a, for example, annular hot-gas passage 111, where, by way of example, four successive turbine stages 112 form the turbine 108. Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133. A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses. To be able to withstand the temperatures which prevail there, they may be cooled by means of a coolant. Substrates of the components may likewise have a directional structure, i.e. they are in single-crystal form (SX structure) or have only longitudinally oriented grains (DS structure). By way of example, iron-base, nickel-base or cobalt-base superalloys are used as material for the components, in particular for the turbine blade or vane 120, 130 and components of the combustion chamber 110. Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element and/or hafnium).

Alloys of this type are known from EP 0 486 489 B1, EP 0 786 017 B1, EP 0 412 397 B1 or EP 1 306 454 A1, which are intended to form part of the present disclosure with regard to the chemical composition.

A thermal barrier coating may also be present on the MCrAlX, consisting, for example, of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

The guide vane 130 has a guide vane root (not shown here) facing the inner housing 138 of the turbine 108 and a guide vane head at the opposite end from the guide vane root. The guide vane head faces the rotor 103 and is fixed to a securing ring 140 of the stator 143.

Figure 4:
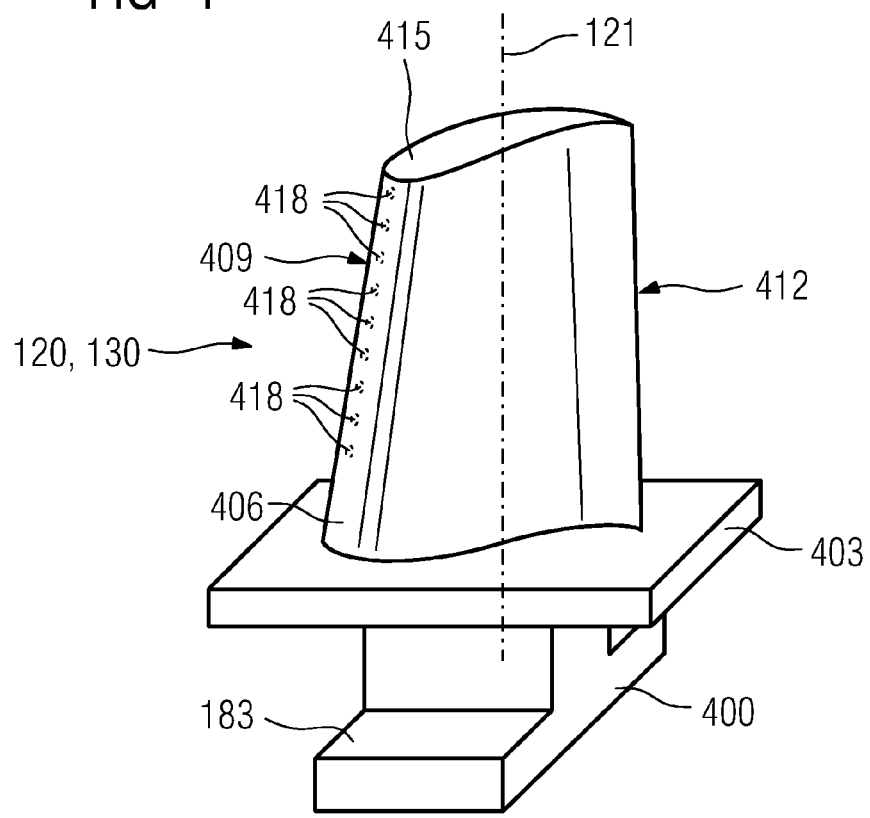

FIG. 4 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406. As a guide vane 130, the vane 130 may have a further platform (not shown) at its vane tip 415.

A blade or vane root 183, which is used to secure the rotor blades 120, 130 to a shaft or a disk (not shown), is formed in the securing region 400. The blade or vane root 183 is designed, for example, in hammerhead form. Other configurations as a fir-tree root or dovetail root are possible. The blade or vane 120, 130 has a leading edge 409 and a trailing edge 412 for a medium which flows past the main blade or vane part 406.

In the case of conventional blades or vanes 120, 130, by way of example solid metallic materials, in particular superalloys are used in all regions 400, 403, 406 of the blade or vane 120, 130. Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy. The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally. In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component. Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1; these documents form part of the present disclosure.

The blades or vanes 120, 130 may also have coatings protecting against corrosion or oxidation, e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (HO). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

There may also be a thermal barrier coating consisting, for example, of $ZrO_2$, $Y_2O_4$—$ZrO_3$, i.e. unstabilized, partially stabilized or fully stabilized by yttrium oxide and/or calcium oxide and/or magnesium oxide, on the MCrAlX. Columnar grains are produced in the thermal barrier coating by suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (illustrated in dashed lines).

The invention claimed is:

1. A pyrochlore material, comprising:

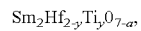

wherein $0 \leq a \leq 1$, and $0 < y < 2$.

2. A pyrochlore material, comprising:

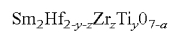

wherein $0 < z < 2$, $0 < y < 2$ and $y + z < 2$.

* * * * *